United States Patent [19]
Leidig

[11] 3,866,552
[45] Feb. 18, 1975

[54] ROTO SOD SEEDER
[76] Inventor: Raymond H. Leidig, Route 3, Box 504, Lake Charles, La. 70601
[22] Filed: Oct. 11, 1973
[21] Appl. No.: 405,594

[52] U.S. Cl.................... 111/85, 172/60, 172/112
[51] Int. Cl............................................ A01c 5/00
[58] Field of Search .................. 111/85, 86, 8, 10; 172/112, 60

[56] References Cited
UNITED STATES PATENTS

| | | | |
|---|---|---|---|
| 2,364,043 | 12/1944 | Ariens | 172/112 X |
| 2,366,389 | 1/1945 | Deavenport | 111/85 X |
| 2,694,356 | 11/1954 | Haas | 111/85 X |
| 3,194,193 | 7/1965 | Walters | 172/112 X |
| 3,398,707 | 8/1968 | McClenny | 111/85 |

FOREIGN PATENTS OR APPLICATIONS
238,146  3/1962  Australia............................... 111/8

*Primary Examiner*—Stephen C. Pellegrino
*Attorney, Agent, or Firm*—Victor J. Evans & Co.

[57] ABSTRACT

A sod seeder that has an individual roto tiller enclosed in individual boots for cultivating and mixing fertilizer in a narrow strip of soil. Several varieties of seed may be fed into the rear of the boot so that the seed can be dropped in the soil mixed with fertilizer. A seed trough is provided for controlling the planting depth of the seed, and a packing wheel is provided to force the air from around the seed so as to permit the seed to be enclosed by fine soil.

2 Claims, 7 Drawing Figures

FIG. 4.
FIG. 5.
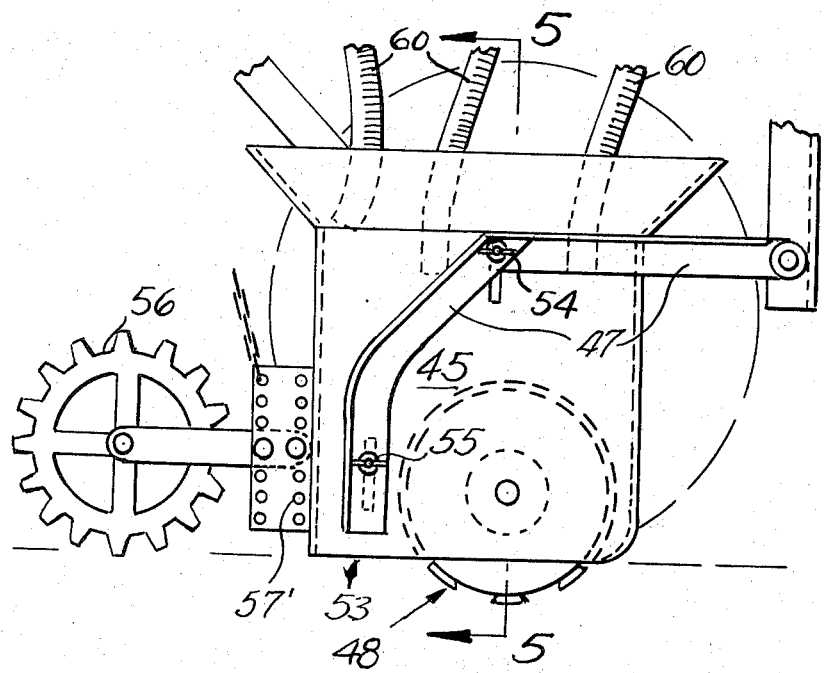
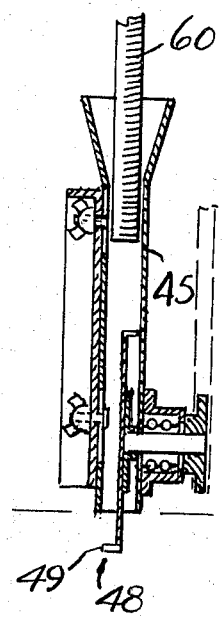
FIG. 6.
FIG. 7.
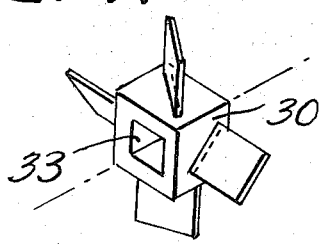

ROTO SOD SEEDER

BACKGROUND OF THE INVENTION

1. FIELD OF THE INVENTION

The present invention relates to agricultural equipment, and more particularly to a sod seeder for selectively depositing material such as seed and fertilizer in the soil in the most advantageous manner.

2. SUMMARY OF THE INVENTION

A sod seeder is provided that has individual roto tillers enclosed in individual boots, and whereby fertilizer can be provided in narrow strips of soil as desired or required. In addition, several varieties of seed can be fed into the rear of the boot so that it can be dropped in the soil mixed with fertilizer.

The primary object of the present invention is to provide a roto sod seeder that will permit the user to have or accomplish improved planting techniques for seeds without the necessity of using expensive means of cultivating the ground for a seed bed.

Another object of the present invention is to provide a roto sod seeder that is ruggedly constructed and relatively simple and inexpensive to manufacture and operate.

Other objects and advantages will become apparent in the following specification, when considered in the light of the attached drawings.

BRIEF DESCRIPTION OF THE DRAWINGS

FIG. 4 is a fragmentary elevational view illustrating certain constructional details of the present invention, and taken on the line 4—4 of FIG. 1;

FIG. 5 is a sectional view taken on the line 5—5 of FIG. 4;

FIG. 6 is a bottom plan view of the arrangement shown in FIGS. 4 and 5; and

FIG. 7 is a perspective view of one of the agitators.

DESCRIPTION OF THE PREFERRED EMBODIMENT

Figure 1:
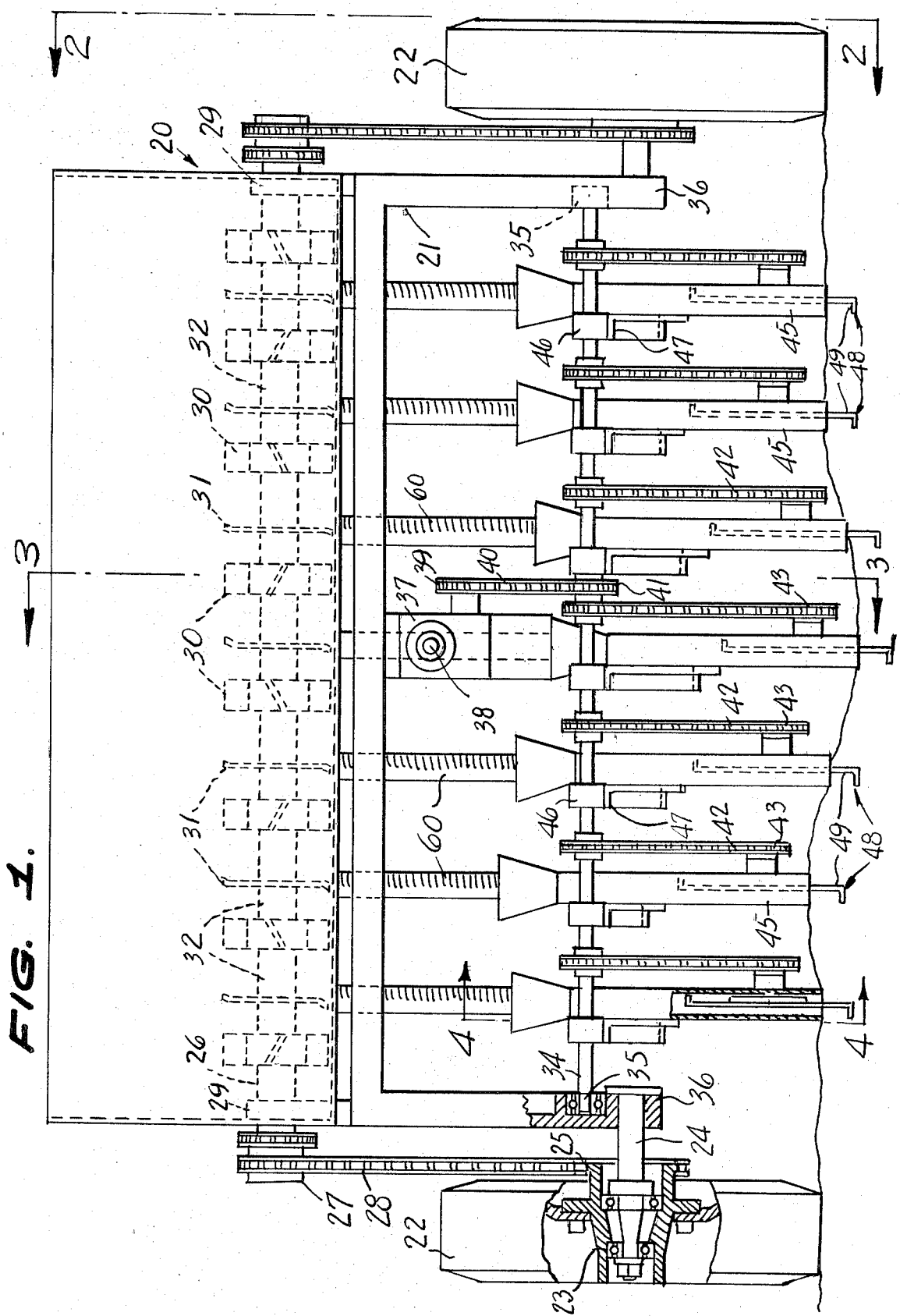
FIG. 1 is an elevational view of the roto sod seeder of the present invention, with parts broken away and in section for clarity of illustration.
Figure 3:
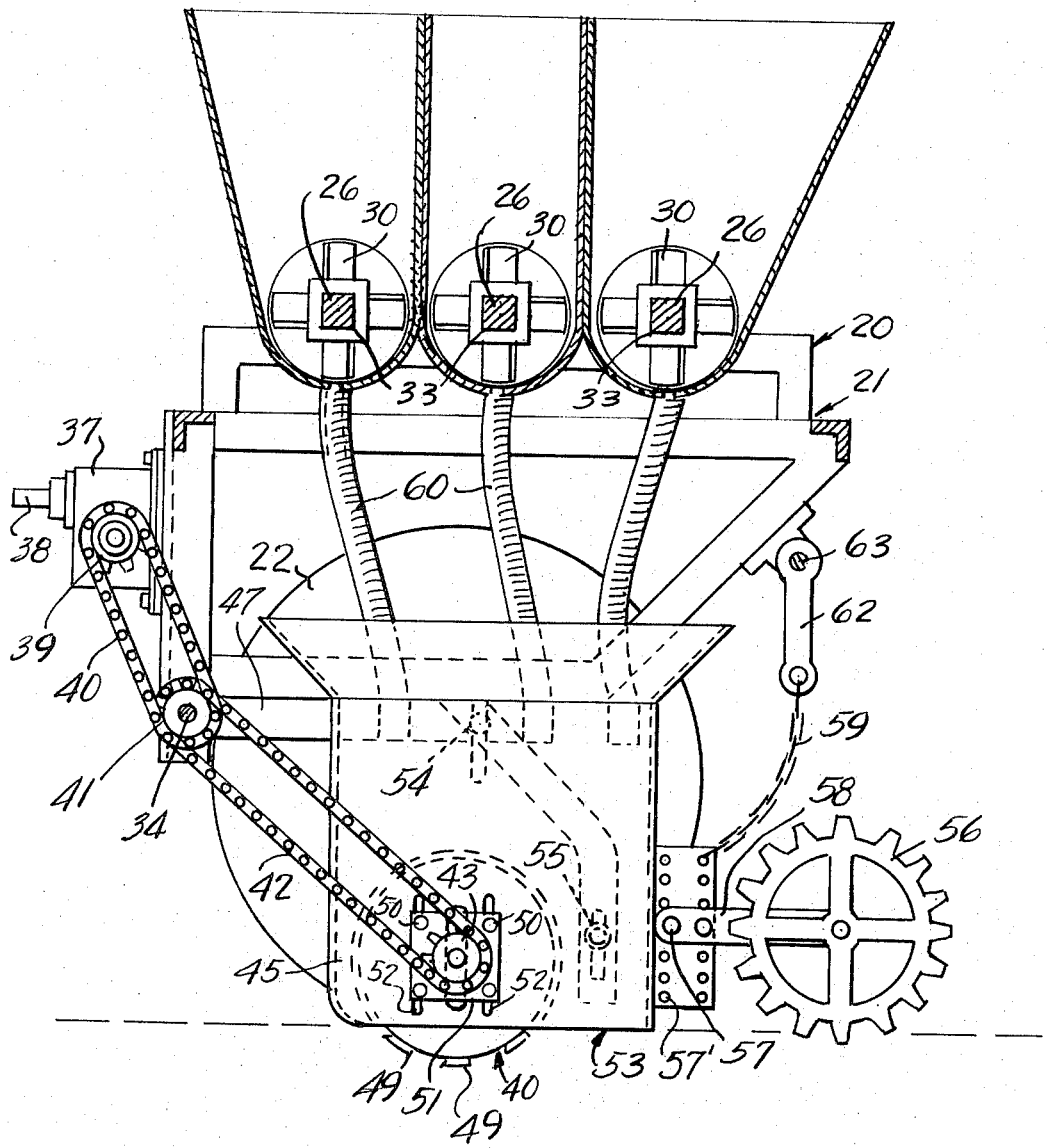
FIG. 3 is a sectional view taken on the line 3—3 of FIG. 1.

Referring in detail to the drawings, the numeral 21 indicates the main frame for the present invention as indicated in its entirety by the numeral 20, whereas the numeral 22 indicates ground-engaging wheels, FIG. 1. The wheels 22 are provided with hubs 23 that have axles 24 connected thereto, and the sprocket 25 is arranged on the hub 23. The numeral 26 indicates a line shaft that has a sprocket 27 thereon, and an endless chain 28 is trained over the sprockets 25 and 27 as shown in the drawings. Ball bearings 29 are adapted to be provided for the line shaft 26. As shown in FIG. 3, for example, the line shaft 26 is square in cross section and mounted on the line shaft 26 are attachments including agitators 30, feeders 31, and spacers 32 which have square shaped holes or openings such as the square shaped openings 33 therein, FIG. 7, so that it is not necessary to use a key or set screw for holding these parts in place on the line shaft 26.

As shown in FIG. 3, there is provided a power gear drive unit 37 which is adapted to be powered from either a power shaft from a tractor, a hydraulic motor with hydraulic fluid furnished by a tractor or an auxiliary motor mounted on the main frame 21, and a driven shaft 38 is operatively connected to the power gear drive 37 for this purpose. The power gear drive 37 transmits power to the power shaft 34, and the power shaft 34 turns in ball bearings 35 that are retained in the main frame brackets 36 as, for example, shown in FIG. 1.

The power gear drive 37 transmits power to the line shaft or power shaft 34 through sprocket 39, chain 40, and double sprocket 41, of which one side furnishes power to the roto tiller through the chain 42 and sprocket 43, the balance of the roto tillers receiving power from the line shaft 34 through the sprocket 44.

The numeral 45 indicates a boot that follows the contour of the ground by means of hinge action through bearing 46 in bracket 47 and on line shaft 34.

The depth of cultivation is maintained by raising or lowering the tiller wheel 48 with tines 49 by the following procedure: The bolts 50 can be loosened and then a sliding bearing bracket 51 can be moved up or down, FIG. 3, due to the provision of the slots 52, and then the bolts 50 can be tightened to maintain the parts stationary in their adjusted position.

The depth of seed covering can be maintained or controlled by raising or lowering the adjustable seed trough 53 by loosening the bolts 54 and 55 holding bracket 47 and then sliding the trough 53 up or down and then, after the parts have been moved to their desired position, the bolts 54 and 55 can be tightened.

Figure 2:
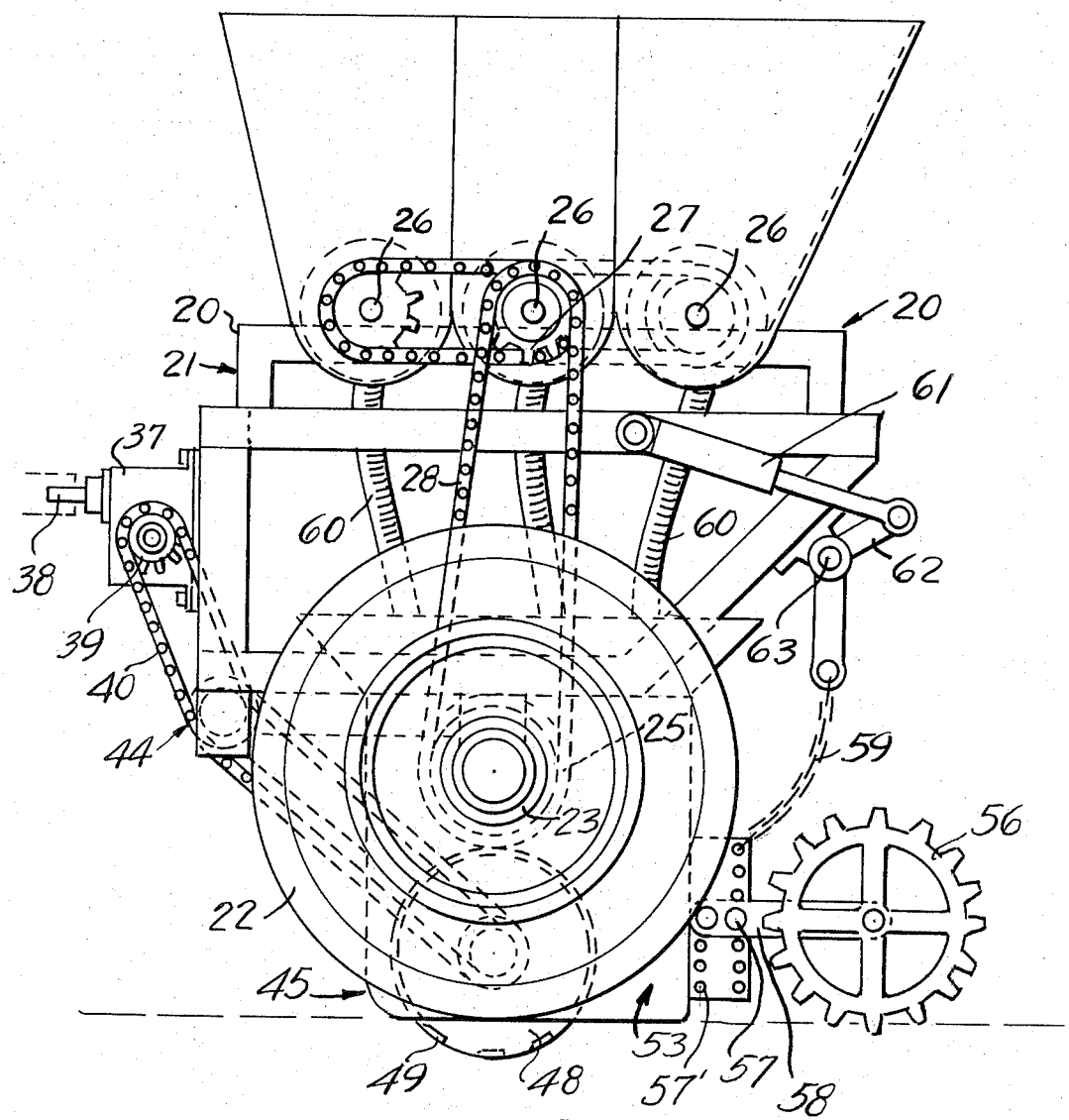
FIG. 2 is a sectional view taken on the line 2—2 of FIG. 1.

The numeral 56 indicates a packing wheel that can be adjusted for the desired amount of soil compaction around the seed by loosening the bolt 57, FIG. 2, whereby the bracket or arm 58 can be raised or lowered to the desired location, and then the bolt 57 can be tightened. The bolt 57 can selectively engage spaced apart openings 57' so that this adjustment can be made.

There is further provided a means for increasing the width between planting rows and this can be accomplished by removing every other chain 42 or as many as desired or required from the line shaft 34, sprocket 44, and then lifting the boot 45 by shortening of a chain 59. Then, the feeders 31 can be removed from the shaft 26 and this can be easily accomplished and then suitable caps can be placed in the feed outlets 60.

The boots 45 with the roto tiller wheels 48 may all be readily lifted for transportation, storage or the like, by actuating a hydraulic cylinder 61 which operates arms 62 on the shaft element 63, FIG. 2, and the shaft 63 is arranged along the back of the main frame 21 as shown in the drawings.

The present invention may be drawn or pulled in any suitable manner, as for example by means of a conventional tongue connected to a draft vehicle, or by a three point system if the draft tractor is equipped or provided with the same.

From the foregoing, it will be seen that there has been provided a roto sod seeder which accomplishes certain important advantages. For example, the present invention will save the farmer considerable amounts of money by not needing as many powerful tractors and large plows and cultivators and fuel as well as manpower for the preparation of the seed bed.

The present invention is especially adaptable for the rice growing industry. For example, the present invention can be used in rice fields with greater advantages than conventional systems. Thus, the fields may be planted and the cover crop can be mowed as close as possible as, for example, with a rotary mower and the mulch can be kept on the ground. The field can then be flooded with water and permitted to stand for several days and after several days the water can be drained so that the rice can come up and when the rice is large enough it can be suitably worked so that if additional crops of rice are planted the land can be kept flooded until the later crops of rice are at the same height or size as the previous rice. By flooding after mowing, the weeds and grass will be drowned so that there will be a minimum amount of weeds and grass in the rice. By harvesting, the yield will be as good as conventional planting with approximately one third of the cost.

It will therefore be seen that there has been provided a sod seeder that has individual roto tillers enclosed in individual boots. Fertilizer can be cultivated and mixed in a narrow strip of soil. Several varieties of seed can be fed in the rear of the boot, dropping in the soil mixed with fertilizer. A seed trough is provided that controls the planting depth of the seed. A packing wheel is also provided to force the air from around the seed and permit the seed to be enclosed by fine soil.

The parts can be made of any suitable material and in different shapes or sizes as desired or required.

An important aspect or feature of the present invention is to provide improved planting techniques for seeds without expensive labor and the like that is usually required in cultivating the ground for a seed bed. Other types of sod seeders do not cultivate the ground to place the seed therein and likewise do not premix fertilizer with the soil before dropping the seed into the soil. Further, other such devices only open a narrow strip and drop the fertilizer and seed into the opening, and depending upon gravity of the soil to close the opening. This does not give a one hundred percent coverage and all the air is not forced out by the packers. Further, the fertilizer burns some of the seeds and tender sprouts. The present invention eliminates these shortcomings and therefore requires less seed for the desired number of plants.

In the present invention, each tiller wheel is individually powered and individually arranged so they follow the contour of the ground such as ditches and terraces or levees. Each packer wheel is attached to the individual boot and may be adjusted to the desired compaction of the seed.

In the drawings, there is shown the arrangement of individual boots with the power drive to the boots and wheels for driving the fertilizer and seed feeders in the hopper.

The drawings also illustrate the arrangement of the frame with the attachment of the hopper and fertilizer and seed feeders to which the roto tiller feeder system is applicable.

The roto tiller wheel has the tines attached and enclosed within the boot, and the top is enlarged to receive the fertilizer and seed. As previously stated and shown, the boots have adjustable slots for the seed trough depth control, and there is provided a hydraulic cylinder arrangement for raising and lowering the boots. The power gear case 37 is attached and arranged as shown.

The shafts such as the shaft 26 are square or rectangular in cross section as shown in FIG. 3, and the shafts 26 have the seed and fertilizer agitators thereon, as well as the other accessories.

The hopper with the seed and fertilizer feeders are representative only and are used to illustrate the principle of the present invention but it is to be understood that the present invention can be applied to any comparable hopper and feeder apparatus.

Having thus described the preferred embodiment of the invention it should be understood that numerous structural modifications and adaptations may be resorted to without departing from the spirit of the invention.

What is claimed is:

1. In a roto sod seeder, a main frame, ground engaging wheels connected to said main frame, a line shaft adjacent said frame, chain and sprocket means connecting said line shaft to said wheels, attachments mounted on said line shaft, a power gear drive unit on said frame powered from an outside power source, a power shaft operatively connected to said power gear unit, a plurality of boots, bracket means individually hingedly mounting each of said boots on said power shaft enabling each boot to follow the contour of the ground, a plurality of tiller wheels having tines for maintaining the depth of cultivation, means adjustably mounting a tiller wheel within each boot, each of said boots including a seed trough for controlling the depth of seed covering, means adjustably securing a seed trough on a bracket means, packing wheel means adjustably mounted on said bracket means for the desired amount of soil compaction around the seeds, lift means on said seeder secured to said boots for varying the width between planting rows, and a hydraulic cylinder on said seeder and connected to said lift means for selectively lifting the boots and tiller wheels, seed supply means for depositing seed into the seed troughs.

2. A device as claimed in claim 1 wherein each tiller wheel is individually powered and individually arranged to follow the contour of the ground.

* * * * *